July 5, 1932.  L. C. SOMERS  1,865,976

CHLORINATOR

Filed Dec. 8, 1930

Inventor

Louis C. Somers.

By

Attorney

Patented July 5, 1932

1,865,976

UNITED STATES PATENT OFFICE

LOUIS C. SOMERS, OF LOS ANGELES, CALIFORNIA

CHLORINATOR

Application filed December 8, 1930. Serial No. 500,771.

This invention relates to an apparatus for charging liquids with gas and particularly pertains to an apparatus for effecting the sterilization of water by the action of chlorine gas.

An object of the invention is to provide a chlorinator which is so constructed and operated as to insure a thorough intermixture of chlorine gas and the liquid under treatment, and in which the parts are so constructed and arranged as to render the apparatus highly durable and not liable to get out of order.

Another object is to provide an apparatus for subjecting liquids to the action of gases in which an incoming stream of liquid under pressure is sprayed into an incoming stream of gas under pressure in such manner as to bring the gas into intimate admixture with the liquid.

Another object is to provide an apparatus of the above character which is operated solely under the pressure of the gas and liquid and which during operation is self controlled without the aid of pressure compensators, regulators and other appurtenances and accessories commonly employed in such apparatus.

Another object is to provide an apparatus for treating water or other liquids with chlorine gas in which the liquid under treatment may be impregnated with ammonia previous to being subjected to the action of the gas and in which liquid ammonia may be employed and automatically introduced into the liquid as the latter is used.

With the foregoing objects in view together with such other objects and advantages as may subsequently appear, the invention resides in the parts and in the combination, construction and arrangement of parts hereinafter more fully described and claimed and illustrated by way of example in the accompanying drawing in which:

Figure 1:
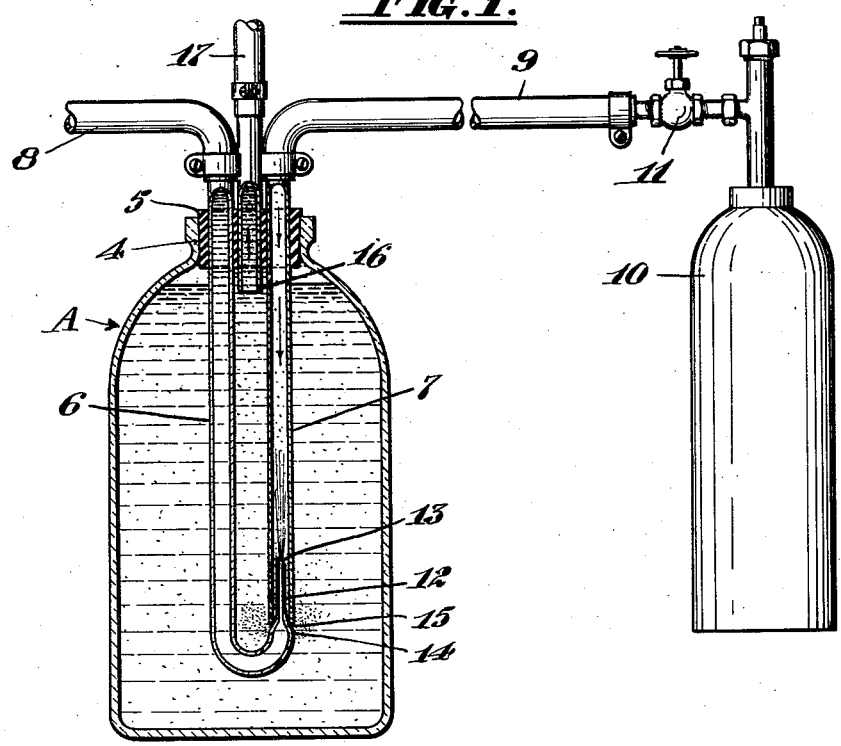
Figure 1 is a view of the apparatus as seen in vertical section and elevation.
Figure 2:
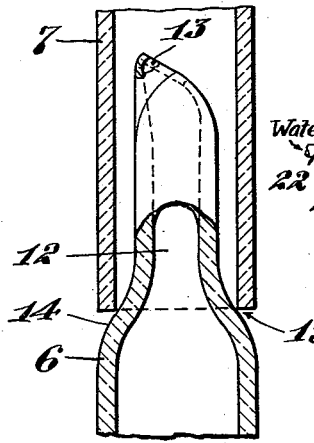
Figure 2 is an enlarged detail in section of the liquid and gas mixture.
Figure 3:
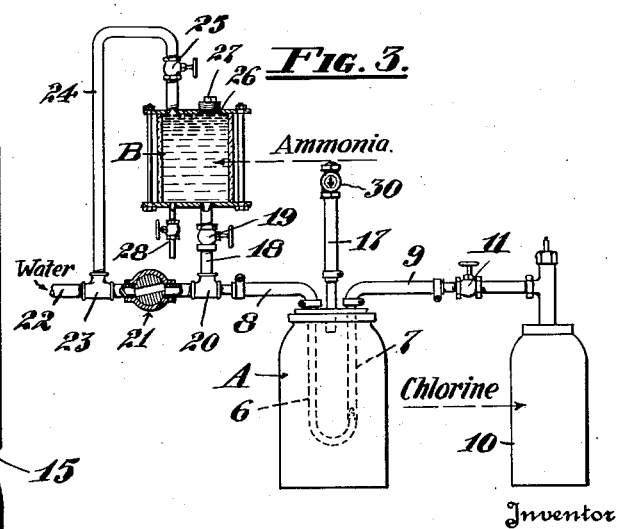
Figure 3 is a diagrammatic view of the apparatus illustrating it as equipped with an ammonia charger.

Referring to the drawing more specifically, A indicates a liquid container which is preferably formed of glass and which container has an open upper end 4 fitted with a closure 5 preferably formed of rubber or similar composition.

In carrying out the invention a pair of glass tubes 6 and 7 are provided, the upper end portions of which extend through the closure 5 and connect with liquid and gas supply conduits 8 and 9 respectively; the conduit 8 leading to a suitable source of liquid supply under pressure and the conduit 9 leading to a reservoir 10 containing gas under pressure and from which gas is delivered to the conduit 9 and tube 7 through a control valve 11.

The tube 7 extends downwardly into the container A and terminates in an open end spaced from the bottom of the container. This tube is preferably of uniform internal diameter throughout its length.

The tube 6 extends downwardly into the container parallel with the tube 7 and has its lower end upturned and terminating in a restricted throat 12 projecting upwardly into the lower end of the tube 7 and terminating in a discharge outlet 13; the throat 12 and outlet 13 constituting a nozzle through which liquid delivered through the tube 6 will be discharged in the form of a spray interiorly of the tube 7 in a direction opposite to the direction of flow of gases in the latter.

The tube 6 is formed at the base of the throat 12 with a curved shoulder 14 contiguous to which the lower end of the tube 7 terminates in slightly spaced relation to form a restricted annular communication 15 between the lower end of the tube 7 and the interior of the container A.

Leading through the closure 5 is a conduit 16 the lower end of which opens to the container contiguous the upper end thereof and the upper end of which connects with a pipe 17 leading to a suitable point of discharge.

Where it is desired to treat the liquid delivered to the container A with ammonia, a reservoir B is provided for containing liquid ammonia, the lower end of which reservoir connects through a pipe 18 through a cut-off and regulating valve 19 with the conduit 8; the pipe 18 being here shown as leading to a T-coupling 20 one end of which connects with the conduit 8 and the other end of which connects with the discharge side of a regulating valve 21 the intake side of which connects with a water supply pipe 22 through a T-coupling 23. Leading from the coupling 23 is a pipe 24 which communicates with the upper end of the reservoir B through a cut-off valve 25. The reservoir B is fitted with a filler opening 26 closed by a cap 27, and has a valved drain outlet 28.

In the operation of the invention the water or other liquid to be treated is delivered under pressure from the pipe 22 to the conduit 8 through the valve 21 which valve is positioned to offer such resistance to the flow of the liquid thereto as to cause a portion of the liquid to by-pass through the pipe 24 and opened valve 25 into the ammonia reservoir B, thereby causing a portion of the ammonia to feed through the pipe 18 and opened valve 19 into the liquid flowing into the conduit 8. The amount of ammonia thus delivered to the liquid will be determined by the adjustment of the valve 21. The liquid entering the ammonia reservoir B dilutes the ammonia therein, and accordingly after a lapse of time the ammonia supply will become exhausted whereupon the valves 19 and 25 are closed and the reservoir B is drained of its water content through the valved drain outlet 28. The reservoir B is then refilled with ammonia through the filler opening 26 whereupon the valves 19 and 25 are re-opened.

The liquid flowing from the conduit 8 passes downwardly through the tube 6 and is discharged upwardly into the tube 7 in the form of a spray as before stated where it is subjected to the action of the chlorine or other gas which is delivered to the tube 7 under pressure on opening of the valve 11. The liquid spray and the gas are thus brought together under their opposing pressure within the tube 7 thus effecting a thorough commingling of the gas and liquid.

Because of the restricted outlet from the mixing tube 7 afforded by the narrow annular space 15 at the lower end thereof, the incoming liquid will accumulate within the lower portion of the mixing tube around the nozzle and may accumulate in such volume as to submerge the nozzle and extend a short distance thereabove. The space 15 will thus be temporarily sealed until pressure is built up within the tube sufficiently to blow the accumulated liquid therefrom through the space 15 into the container A, which latter becomes filled with the gas treated liquid to a level slightly above the lower end of the discharge tube 16, and which tube and the discharge conduit 17 also become filled with the liquid. The conduit 17 leads to any suitable point of discharge and the liquid therein is forced by the pressures developed in the container A to such discharge through a suitable check-valve 30.

The liquid delivered through the intake tube 6 and its nozzle is under a pressure slightly in excess of that of the incoming gas, which insures delivery of the liquid to the mixing tube, and the pressures developed in the container A are in excess of the resistance offered to the discharge of the liquid from the container through the discharge conduit 17.

It will now be seen that an intermittent discharge of the gas treated liquid from the mixing tube will take place, and that on each impulse the liquid will be forcibly ejected through a restricted space (15) and thereby effect a further and more intimate commingling of the liquid and gas.

In event gas bubbles form in the body of liquid in the container they will rise therein and become entrapped at least in most part above the body of liquid immediately below the stopper 5, where such entrapped gas will by reason of being subjected to the pressure of the liquid be caused to be gradually absorbed by the liquid, thus insuring against the discharge of free gas from the apparatus.

The invention is particularly applicable for use in effecting the sterilization of water by chlorine gas, and is especially adapted to be employed in sterilizing water used in swimming pools, and accumulated in storage reservoirs for drinking purposes, and the like; the apparatus being connected into a circulating system by effecting communication between the discharge conduit 17 and the discharge side of such system in the manner commonly employed in the use of such apparatus.

The invention is also applicable for use in sterilizing sewage, and other liquids, and in fact may be employed in various uses where gas treatment of liquid is desired.

It has been found in practice that by the use of this invention a great economy in gas consumption is attained over many chlorinators now generally in use by reason of effecting a more thorough breaking up of the gas and liquid bodies and producing a more complete intermixture thereof, and by reason of effecting a more thorough admixture of the gas and water causes the latter to absorb a larger quantity of gas in proportion to its volume than is ordinarily accomplished thus resulting in a saving in the amount of water required.

I claim:

1. In a liquid and gas mixing apparatus, a liquid container, a mixing tube leading downwardly into said container and opening at its lower end thereto, means for delivering gas under pressure to the upper end of said tube, a liquid supply tube leading downwardly into said container, a nozzle on the lower end of said supply tube disposed in and opening upwardly into said mixing tube, means for delivering liquid under pressure through said supply tube and nozzle, and a discharge tube leading from the upper portion of said container.

2. The structure called for in claim 1 in which the open lower end of the mixing tube has a restricted outlet.

3. In a chlorinator, a liquid container, a mixing tube leading into said container having an open end communicating with the interior of said container, a nozzle extending into the open end of said mixing tube, the open end of said tube encompassing said nozzle in spaced but proximate relation thereto to form said tube with a restricted outlet, means for delivering gas under pressure to said tube, means for delivering liquid under pressure to said nozzle, and means for directing liquid from the said container at a point above the open end of said tube.

4. A chlorinator comprising a liquid container, a mixing tube leading into said container having a restricted discharge outlet opening to said container, means for delivering gas under pressure to said tube, a nozzle opening into said tube in a direction opposite that of the flow of gas through said tube, a tube for directing liquid from the exterior of said container to said nozzle, and a liquid discharge conduit communicating with the interior of said container.

5. A chlorinator comprising a liquid container, a mixing tube leading into said container having a restricted discharge outlet opening to said container, means for delivering gas under pressure to said tube, a nozzle opening into said tube in a direction opposite that of the flow of gas through said tube, a tube for directing liquid from the exterior of said container to said nozzle, and said container having a closed upper end, and a discharge tube projecting downwardly into said container and terminating below the closed upper end thereof to form a gas trap therearound.

LOUIS C. SOMERS.